US007068388B2

(12) United States Patent
Kimura

(10) Patent No.: US 7,068,388 B2
(45) Date of Patent: Jun. 27, 2006

(54) PRINTING A PLURALITY OF PRINT JOBS OF A GROUP IN A DESIGNATED ORDER

(75) Inventor: Mitsuo Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 09/969,797

(22) Filed: Oct. 4, 2001

(65) Prior Publication Data

US 2002/0041395 A1    Apr. 11, 2002

(30) Foreign Application Priority Data

Oct. 6, 2000   (JP) ............................. 2000-307890
Sep. 27, 2001  (JP) ............................. 2001-297447

(51) Int. Cl.
*G06F 3/12*   (2006.01)
*G06K 1/00*   (2006.01)
(52) U.S. Cl. .................. 358/1.15; 709/234; 709/201; 709/236
(58) Field of Classification Search ........... 358/1.15, 358/1.16, 1.13; 718/103; 709/201, 234, 709/236
See application file for complete search history.

(56) References Cited

U.S. PATENT DOCUMENTS 5,923,826 A * 7/1999 Grzenda et al. ........... 358/1.15
5,978,559 A * 11/1999 Quinion ..................... 358/1.15
5,978,560 A * 11/1999 Tan et al. .................. 358/1.15
6,474,881 B1 * 11/2002 Wanda ......................... 400/61
6,788,427 B1 * 9/2004 Okigami ................... 358/1.15
2002/0042797 A1   4/2002 Kimura ....................... 707/500

FOREIGN PATENT DOCUMENTS

| JP | 60-085976 | 5/1985 |
|----|-----------|--------|
| JP | 03-045048 | 4/1991 |
| JP | 09-244827 | 9/1997 |
| JP | 11-119940 | 4/1999 |
| JP | 2000-076218 | 3/2000 |
| JP | 2002-182879 | 6/2002 |

* cited by examiner

*Primary Examiner*—Kimberly Williams
*Assistant Examiner*—Dillon Murphy
(74) *Attorney, Agent, or Firm*—Fitzpatrick, Cella, Harper & Scinto

(57) ABSTRACT

A print application (703) issues print job grouping start and end instructions to a print system (client) (707). The print system (client) (707) reads out the job information spooled at the time of reception of a grouping start instruction from a spooler (705) and stores the information. The print system (client) (707) reads out job information spooled at the time of reception of a grouping end instruction from the spooler (705). The print system (client) (707) then extracts jobs that do not coincide with the stored job information as print jobs to be grouped from the spooler (705) and outputs them.

24 Claims, 15 Drawing Sheets

PRINTING A PLURALITY OF PRINT JOBS OF A GROUP IN A DESIGNATED ORDER

FIELD OF THE INVENTION

The present invention relates to a print system which receives a print instruction for a print job from the spooler of an operating system (OS), then spools the print job in the system again, and schedules the print job and, more particularly, to a method of causing a printer to execute print jobs for which a grouping instruction is generated in regular order in the group without allowing any interruption by another print job when a print system receives a print job grouping instruction from a print application.

BACKGROUND OF THE INVENTION

Recently, as personal computers (PCs) have become remarkably popularized in offices, networking techniques for connecting them have advanced. Conventionally, upon use, printers are connected to PCs in a one-to-one correspondence. As is often the case recently, a printer is connected to a network to allow PCs connected to the network to share the printer.

Under the circumstances, a print system exists, which receives print data written in the printer language created by a printer driver from the spooler of the OS of a PC, and a print job including this print data is spooled again, thereby providing a print job control function more advanced than the function provided by the OS. A known example of the print job control functions is the job grouping function of grouping a plurality of print job by numbering them, and transmitting the grouped jobs to the printer in the set order.

In using the job grouping function in such a print system, print data corresponding to the grouped print jobs are to be transmitted to the printer in the set order.

When a print server is installed in a network, the print server receives a print job from a PC client connected to the network and causes a printer it manages to print, which is directly connected to the network. For this reason, while receiving a print job grouped by the job grouping function from a print application, the print server may receive a print job from another PC client. In this case, print jobs for group printing may be mixed with other print jobs.

In transmitting a plurality of print jobs for group printing from a PC client to the print server, therefore, demands have arisen for a print system having the function of grouping the print jobs into one print job using a job start instruction at the start and a job end instruction at the end.

As a method of realizing this requirement, the following may be used. When the job grouping function is designated by a PC client, print jobs to be grouped are received from the spooler of the OS of the PC client. These print jobs are then spooled again, and the printer driver groups them into one print job. With this operation, a plurality of print jobs can be grouped into one print job. This makes it possible to make a network printer print the grouped print data without any interruption by another print job.

In using the job grouping function in such a print system, a print application inputs print jobs to be grouped to the spooler of the OS upon instructing the print system having the job grouping function to start grouping. When all the necessary print jobs are input to the spooler, the application instructs the print system to end the grouping operation. Upon reception of a grouping start instruction from the print application, the print system executes grouping of the print jobs extracted from the spooler of the OS into one print job until the reception of a grouping end instruction by using a printer driver.

In this method, however, since there is a difference between the timing at which the print system receives a grouping start/end instruction from an application and the timing at which print data is extracted from the spooler, the print jobs output as jobs to be grouped from the print application may not coincide with the print jobs to be grouped by the print system.

SUMMARY OF THE INVENTION

The present invention has been made in consideration of the above problem, and has as its object to provide a print control method and apparatus, a print system, and a storage medium, which can group print jobs in the manner designated by an application.

In order to achieve the above object, one aspect of the present invention has the following arrangement.

There is provided a print control apparatus for setting a plurality of print jobs as member jobs of a group job and continuously printing the member jobs included in the group job in a designated order, characterized by comprising list forming means for comparing a grouping non-target list of print jobs spooled at the time of reception of a job grouping start instruction with a list of print jobs spooled at the time of reception of a job grouping end instruction, and forming a grouping target list by setting differences as print jobs to be grouped.

More preferably, this apparatus further comprises member forming means for, when a spooled print job is received, searching the grouping target list to determine whether the received job is a job to be grouped, and adding the job as a member of the group job if it is determined that the job is to be grouped.

More preferably, even if a spooled print job is received and the job is not contained in the grouping target list, the member forming means determines whether the print job is contained in the grouping non-target list, if the print job is received in a time interval between the instant at which a grouping start instruction is issued and the instant at which a grouping end instruction is issued, and adds the print job as a member of the group job if the job is not contained in the grouping non-target list.

More preferably, the member forming means adds a spooled print job to a print schedule if the print job is received after a grouping end instruction is issued.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

An embodiment of the present invention will be described below with reference to the accompanying drawings.

Figure 1:
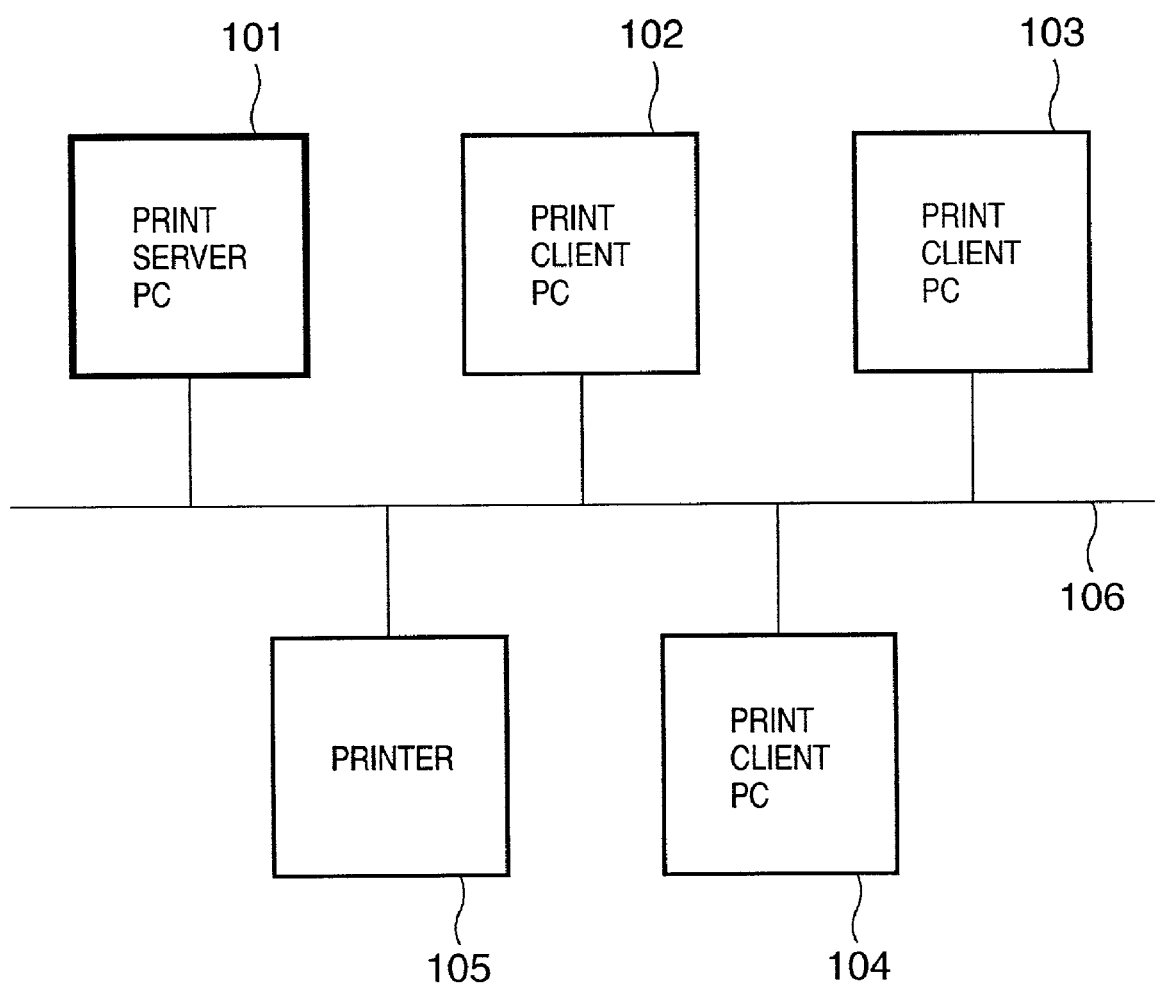
FIG. 1 is a block diagram showing the arrangement of a network system to which a print system according to an embodiment of the present invention is applied.

FIG. 1 is a block diagram showing the system configuration of a network system to which a print system according to an embodiment of the present invention is applied. In the network system according to this embodiment, a print server PC 101, print client PCs 102, 103, and 104, and a printer 105 are connected to a network 106. It is assumed that a total of n print clients and printers are connected to the network. For the sake of convenience, FIG. 1 shows only three print clients and one printer. Although the printer 105 in this embodiment is a network printer directly connected to the network 106, this printer may be a local printer connected to the print server PC 102.

The print server PC 101 is connected to the network 106 through a network cable. The print server PC 101 receives print data described in a printer language from the print client PCs 102, 103, and 104 and transmits the data to the printer 105.

The print client PCs 102, 103, and 104 are connected to the network 106 through a network cable, and transfer print data and print information to the print server PC 101.

The printer 105 is connected to the network 106 through a network interface. The printer 105 converts print data transmitted from the print server PC 101 into dot image page by page and prints them page by page. The network 106 is connected to the print server PC 101, print client PCs 102, 103, and 104, printer 105, and the like.

Figure 2:
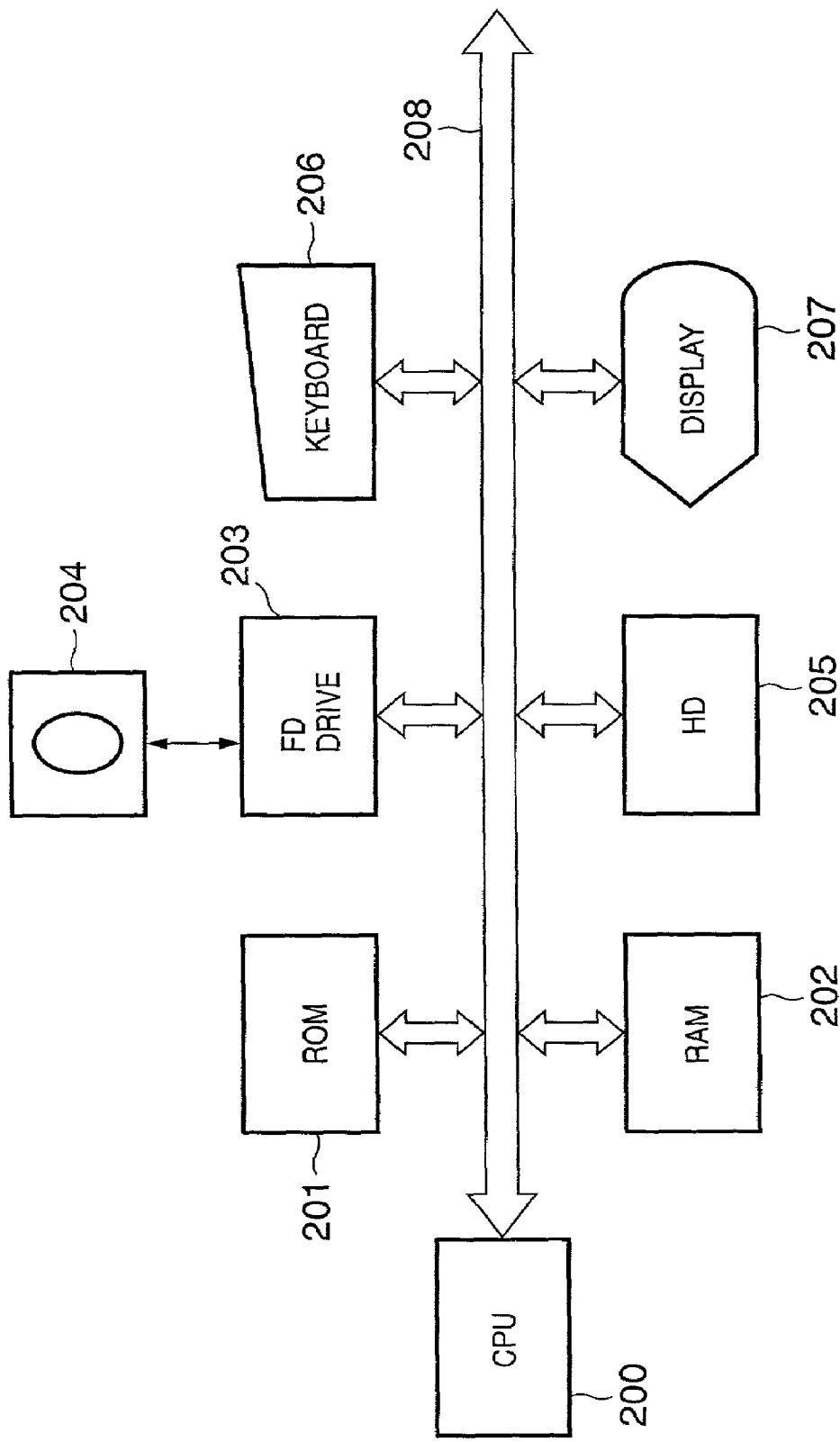
FIG. 2 is a block diagram showing the schematic arrangement of a server and client computers according to the embodiment of the present invention.

FIG. 2 is a block diagram showing the schematic arrangement of a computer for implementing the print server PC 101 and print client PCs 102, 103, and 104 according to the embodiment of the present invention. The computer includes a CPU 200, ROM 201, RAM 202, floppy disk (FD) drive 203, FD 204, hard disk (HD) 205, keyboard 206, display 207, and system bus 208.

Figure 3:
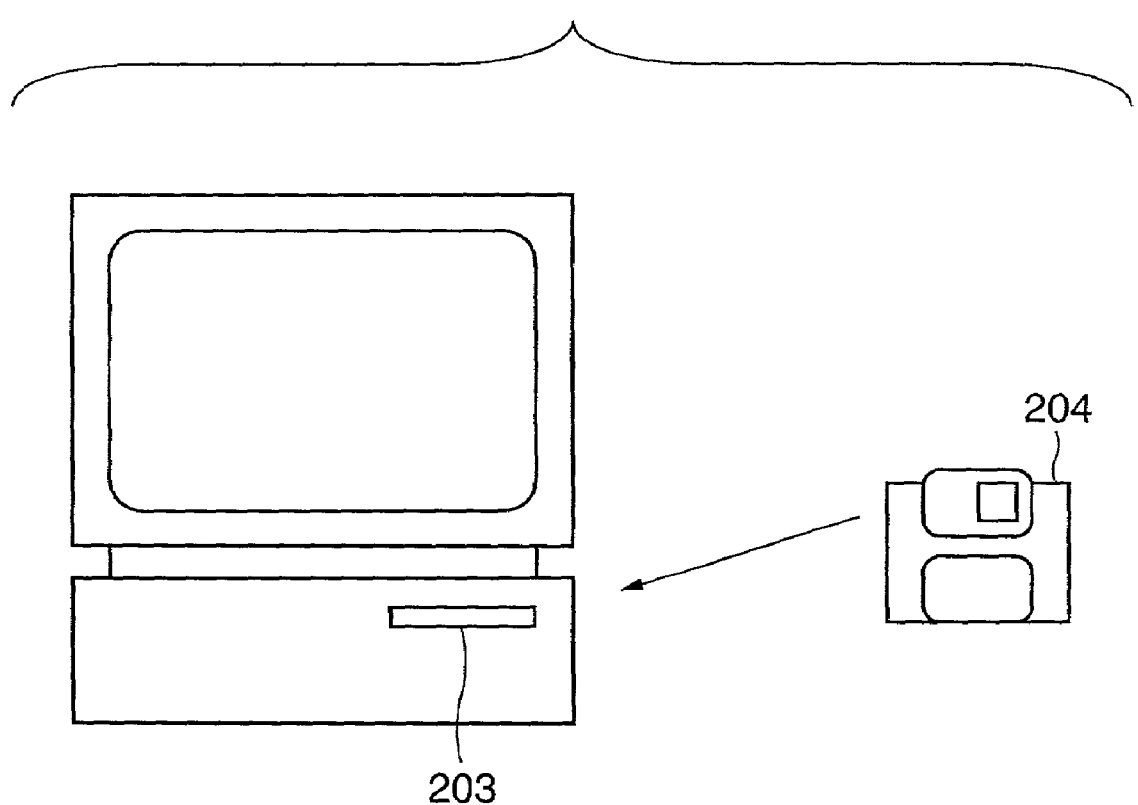
FIG. 3 is a view showing the concept of operation of supplying a program from an FD to the server or client computer according to the embodiment of the present invention.

The CPU 200 executes the operating system (OS), print server program, and the like stored in the HD 205, and performs control to temporarily store information necessary for the execution of a program in the RAM 202. A basic I/O program and the like are stored in the ROM 201. The RAM 202 serves as the main memory, work area, and the like of the CPU 200. As shown in FIG. 3, a print server program, a print system program including a print client program, or the like stored in the FD 204 can be loaded into the computer system through the FD drive 203 mounted in the computer or the like.

Figure 4:
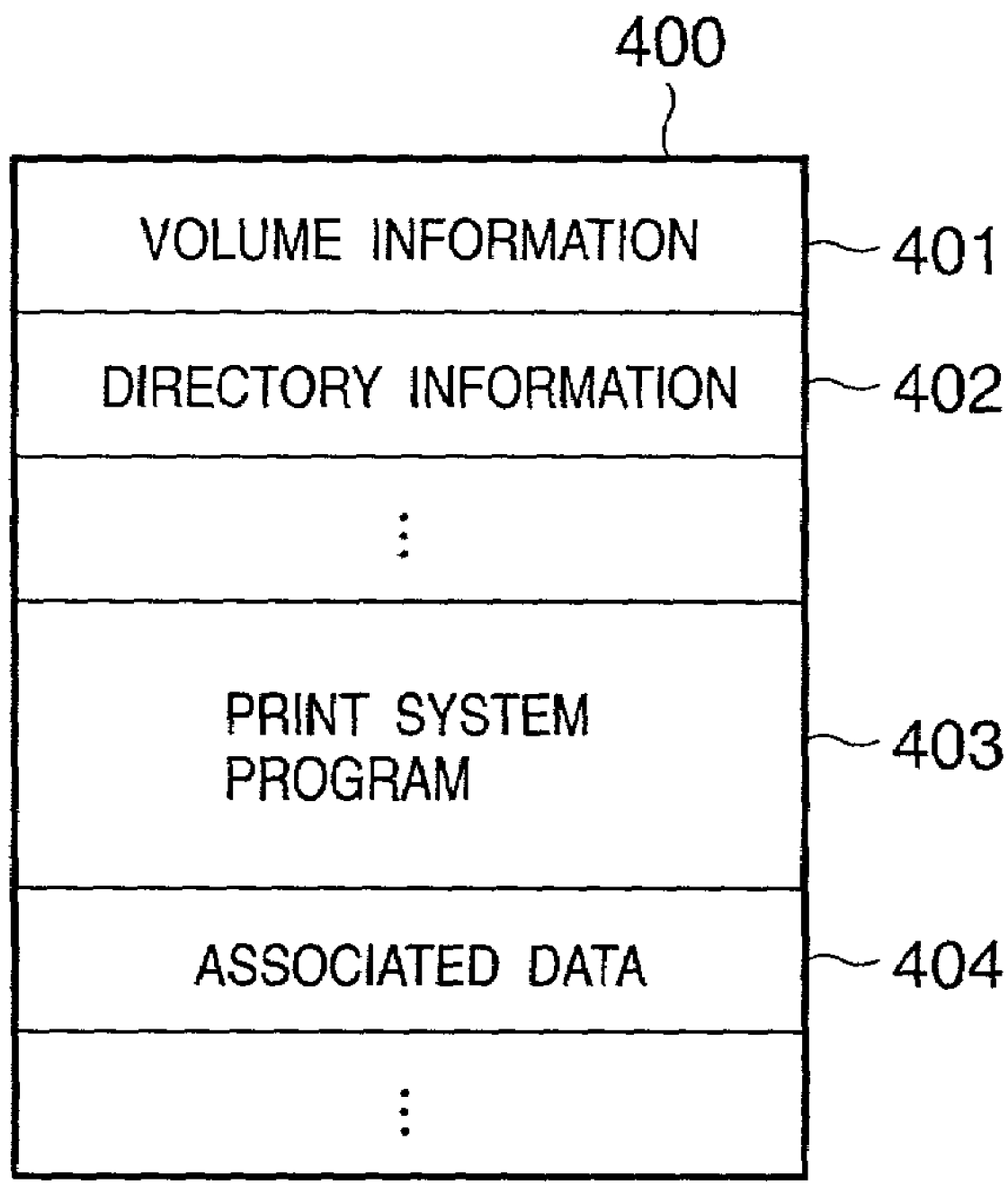
FIG. 4 is a view for explaining the data stored in the FD in the server and client computers according to the embodiment of the present invention.

The contents of the FD 204 can be stored in a storage means such as the HD 205. FIG. 4 shows the arrangement of the contents stored in the FD 204. Referring to FIG. 4, data contents 400 of the FD 204 include volume information 401 indicating the arrangement of data, directory information 402, a program 403 constituted by program codes based on the flow chart of a print system program to be described in this embodiment, and associated data 404.

The HD 205 stores the OS, print application program, print server program, print client program, and the like. The keyboard 206 is used by a user to input device control commands and the like to the print client PCs 103 and 104. The display 207 displays the command input from the keyboard 206, a print state, and the like. The system bus 208 controls the flow of data in the print client PCs 103 and 104.

In this embodiment, the print system program and associated data are directly loaded from the FD 204 into the RAM 202 and executed. However, this program and data may be loaded from the HD 205 into the RAM 202 every time the print system program is operated from the FD 204. In addition, this print system program may be stored in a CD-ROM, IC memory card, or the like other than the FD. Furthermore, the print system program may be recorded on the ROM 201 and set as part of a memory map to allow the CPU 200 to directly execute it.

Figure 5:
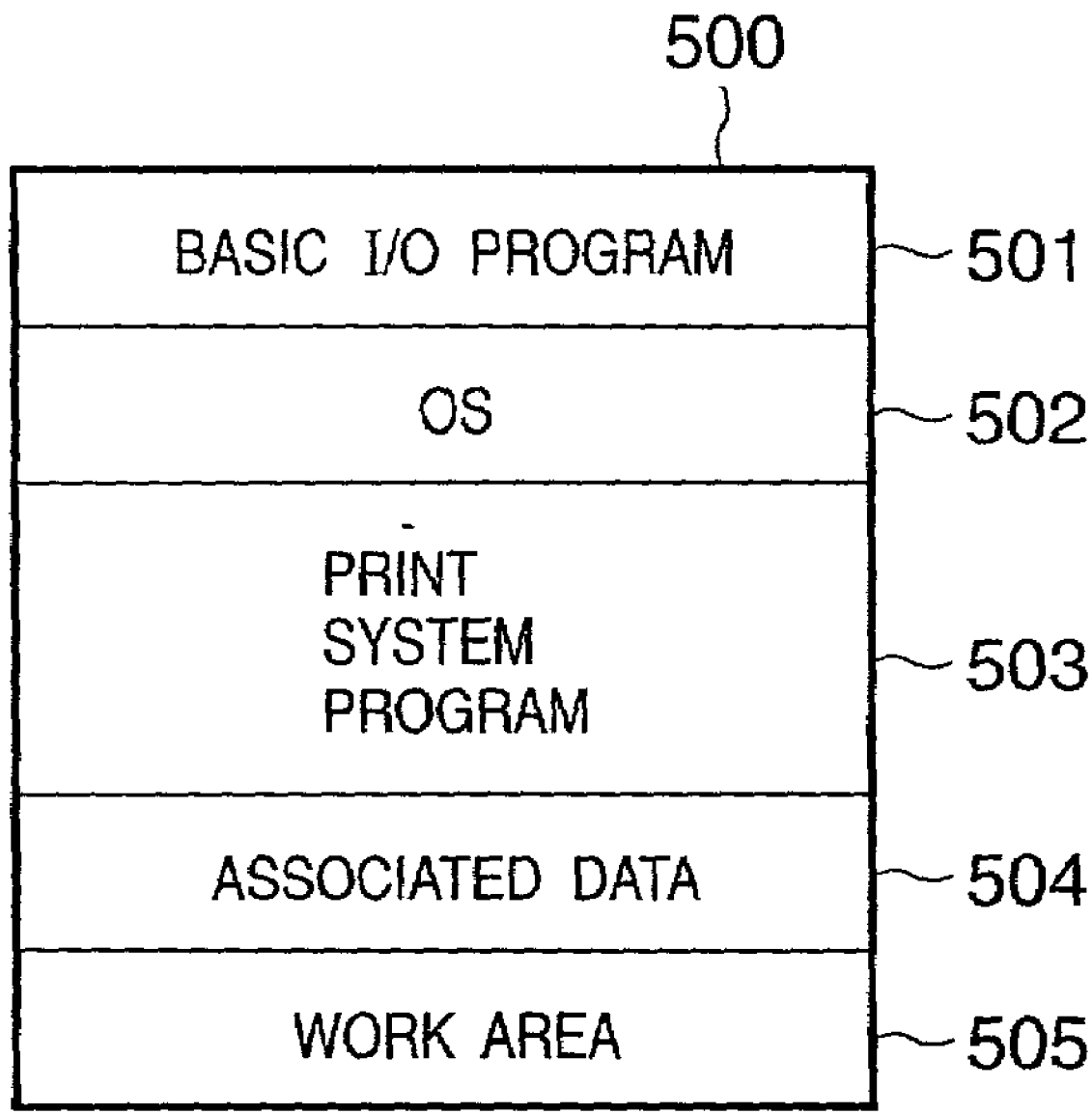
FIG. 5 is a view for explaining a memory map obtained when programs from an FD are mapped in the RAM of the server or client computer according to the embodiment of the present invention.

FIG. 5 shows a memory map in a state where the print system program according to this embodiment is loaded into the RAM 202 and ready to be executed. A basic I/O program 501, OS 502, print system program 503, and associated data 504 are mapped in a memory 500, and a work area 505 in which the CPU 200 executes the print system program is ensured. Note that the basic I/O program 501 is an area where a program having the IPL (Initial Program Loading) function of loading the OS from the HD 205 into the RAM 202 and starting the OS when the computer is powered on is stored.

Figure 6:
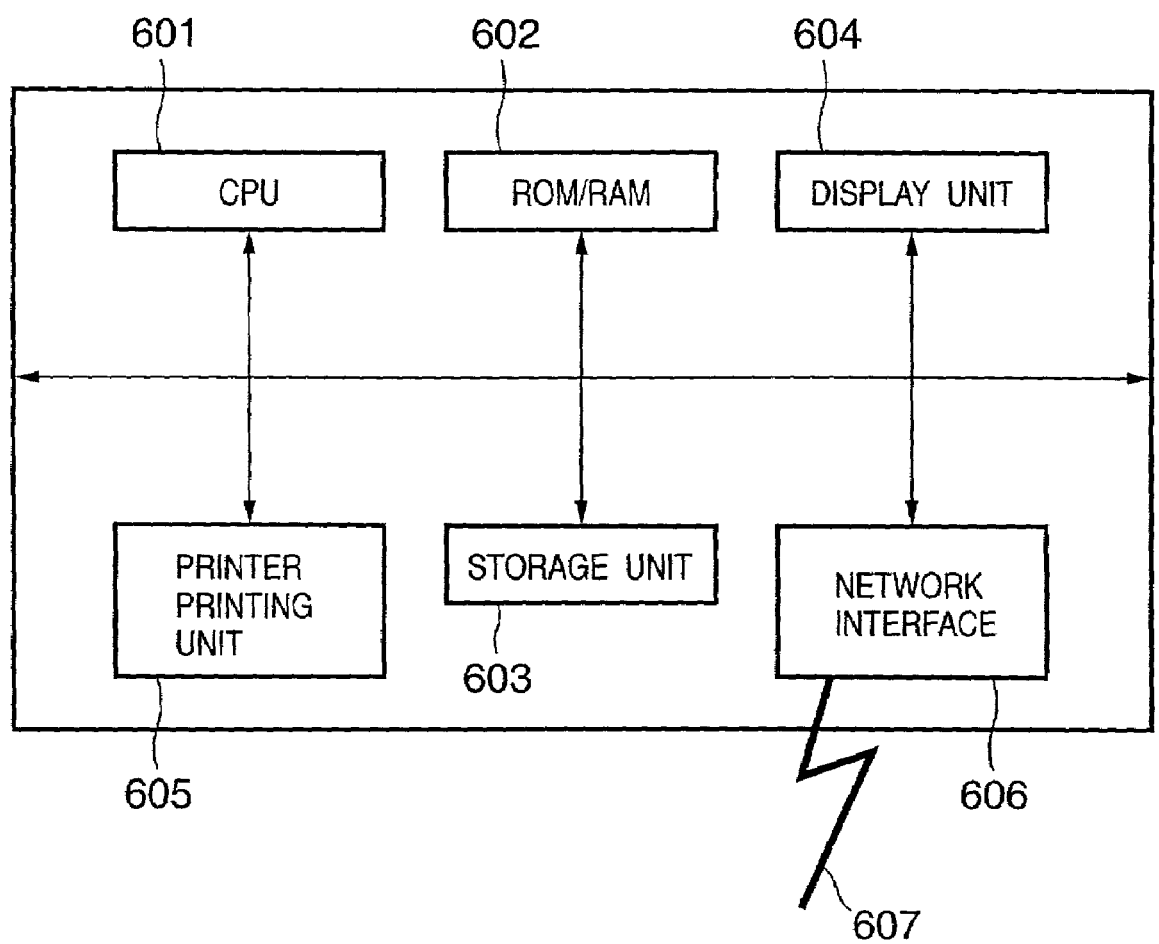
FIG. 6 is a block diagram showing the schematic arrangement of a printer according to the embodiment of the present invention.

FIG. 6 is a block diagram showing the schematic arrangement of the printer 105 according to the embodiment of the present invention. The printer 105 includes a CPU 601, ROM/RAM 602, storage unit 603, display unit 604, printer printing unit 605, network interface 606, and communication line 607.

The CPU 601 controls the overall apparatus. The ROM/RAM 602 includes a buffer for temporarily storing a control program for controlling the CPU 601, constant data, and transmission/reception data. The storage unit 603 is a storage means like, for example, a hard disk, and is used to store the data to be transmitted/received, the control program executed by the CPU 601, and data. The display unit 604 displays the data temporarily stored in the ROM/RAM 602, the contents of the data stored in the storage unit 603, an operation state, and the like. The printer printing unit 605 prints out dot data created by the CPU 601 on the basis of the program stored in the ROM/RAM 602. The network interface 606 communicates print data and the like with an external unit such as a print server PC through the network interface. The communication line 607 serves to connect the network interface 606 to the network 106.

Figure 7:
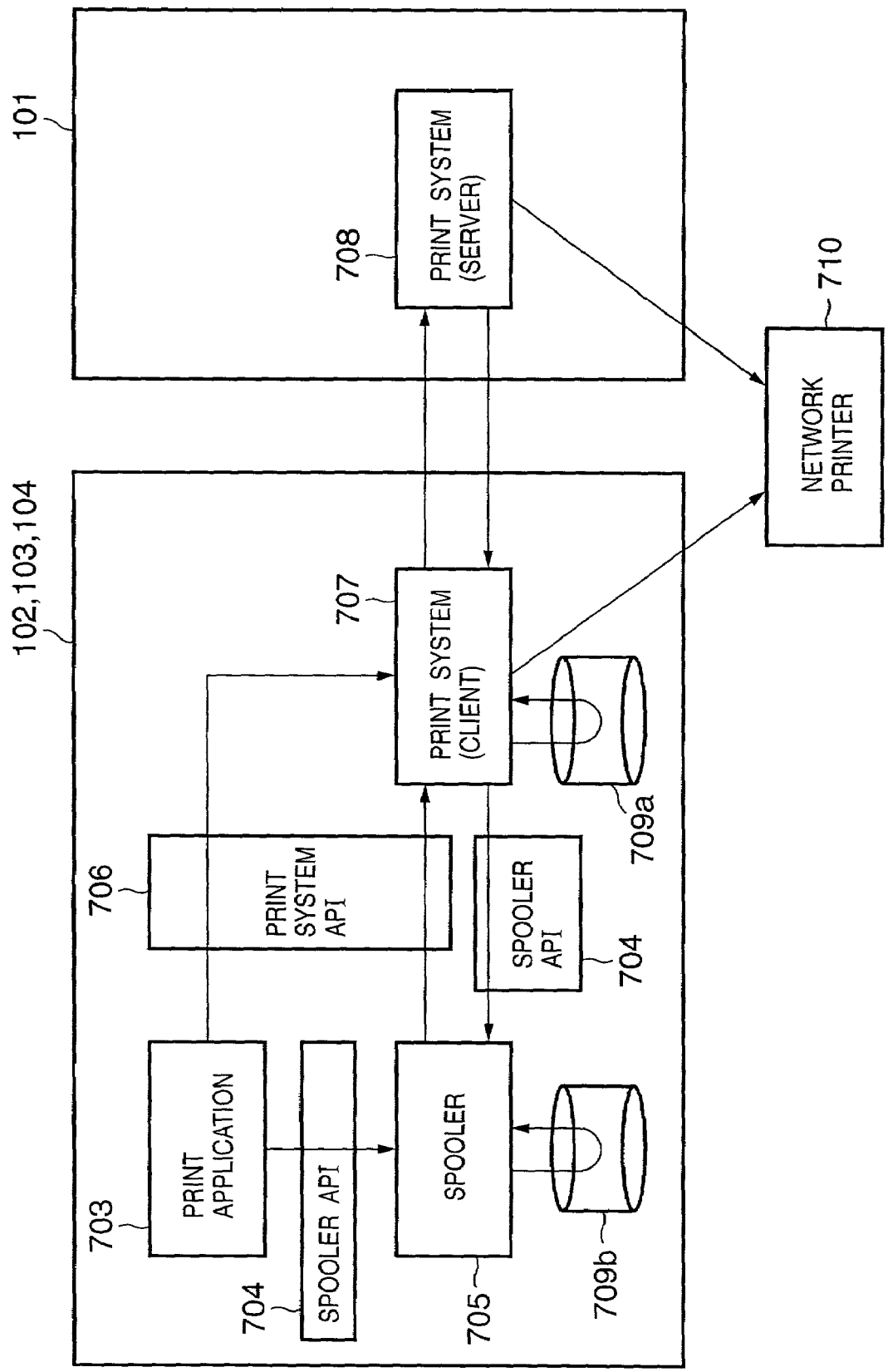
FIG. 7 is a view showing the software module configurations of the client PC and server according to the embodiment of the present invention.

FIG. 7 is a block diagram showing the software module configuration of the print client PCs 102 to 104 and print server PC 101. Reference numeral 703 denotes a print application; 705, a spooler provided by the OS; 704, a spooler API (Application Programming Interface) for providing an interface with the spooler; 707, a client program for the print system; 706, a print system API for providing an interface with the print system; 708, a server program for the print system; 709a and 709b, HDs storing spool files; and, 710, a network printer.

Referring to FIG. 7, the print application 703 notifies the print system (client) 707 through the print system API 706 of an instruction to start grouping, and transfers print jobs to be grouped to the spooler 705 by using the spooler API 704 provided by the OS. Upon transferring all the print jobs, the print application 703 notifies the print system (client) 707 through the print system API 706 of an instruction to end grouping.

The spooler 705 spools the print jobs received from the print application 703 into the HD 709b, converts the print instructions contained in the print jobs into print instructions (device-dependent rendering functions) that can be interpreted by the printer driver, and transfers the rendering functions to the print system (client) 707 through the print system API 706.

The print system (client) 707 serving as a print control module according to the present invention converts the rendering functions received from the spooler 705 into print data through a printer driver (included in the print system (client) 707), and spools the print data in the HD 709a again. The print system (client) 707 then issues a print request to the print system (server) 708. The print system (server) 708 schedules the print request and issues a transmission permission to the print system (client). The print system (client) 707 receives the transmission permission from the print system (server) 708 and transmits the print data spooled in the HD 709a to the network printer 710. In this case, the print data may be transmitted through the print system (server) 708. When the print data is transmitted to the network printer 710 through the print system (server) 708, the print system (server) 708 manages the scheduling of print jobs and transmits the print data received from the client to the network printer 710. When print data is to be transmitted from the print system (client) 707 to the network printer 710, the print system (client) 707 transmits print data to the network printer 710 in accordance with the schedule managed by the print system (server) 708.

In this case, the print system (client) 707 acquires the job information of the print jobs spooled by the spooler 705 from the spooler 705 through the spooler API 704.

Figure 8:
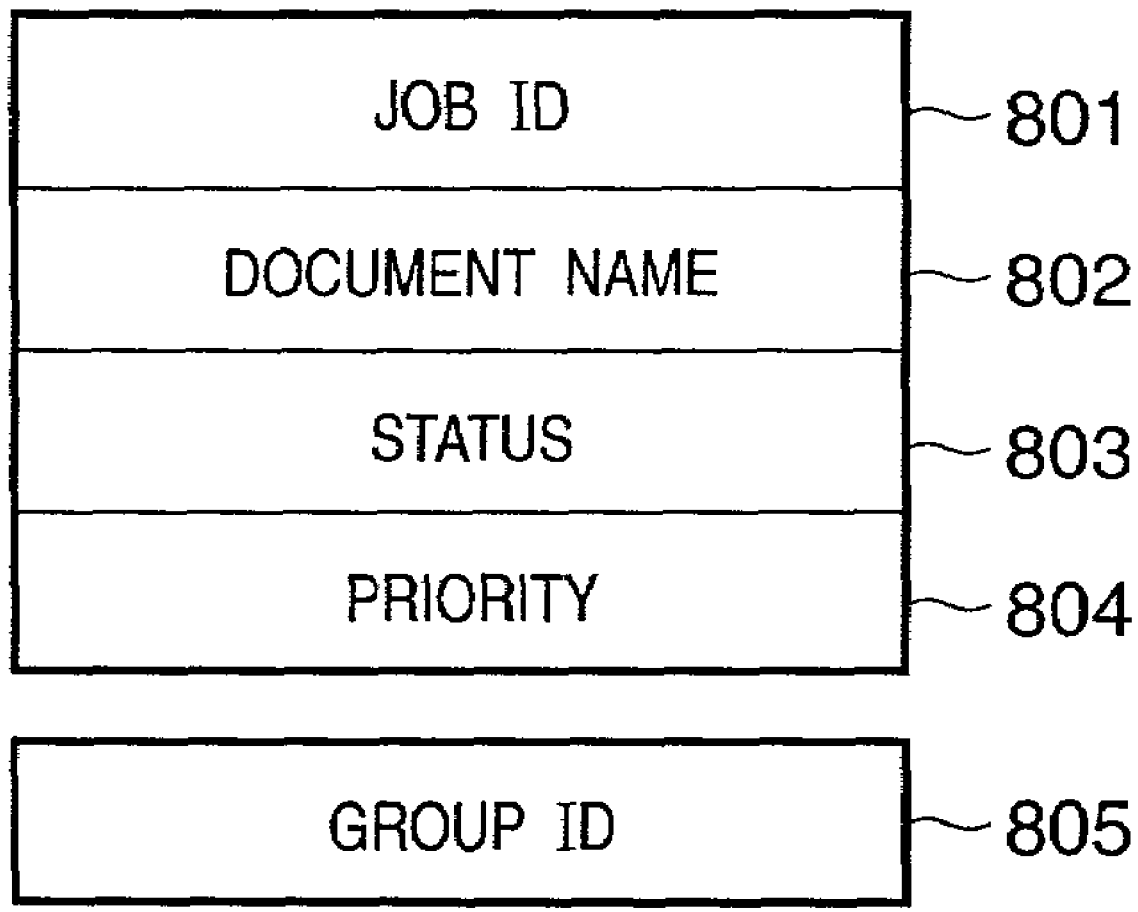
FIG. 8 is a view for explaining print job information according to the embodiment of the present invention.

FIG. 8 shows the job information to be created when the spooler 705 spools a print job. The job information includes a job ID 801 issued by the spooler 705, a document name 802, a status 803, a priority level 804, and the like. The print system (client) 707 acquires job information from the spooler 705, adds a group ID 805 to each print job to be grouped, and adds it to a grouping target list of print queue information.

Figure 9:
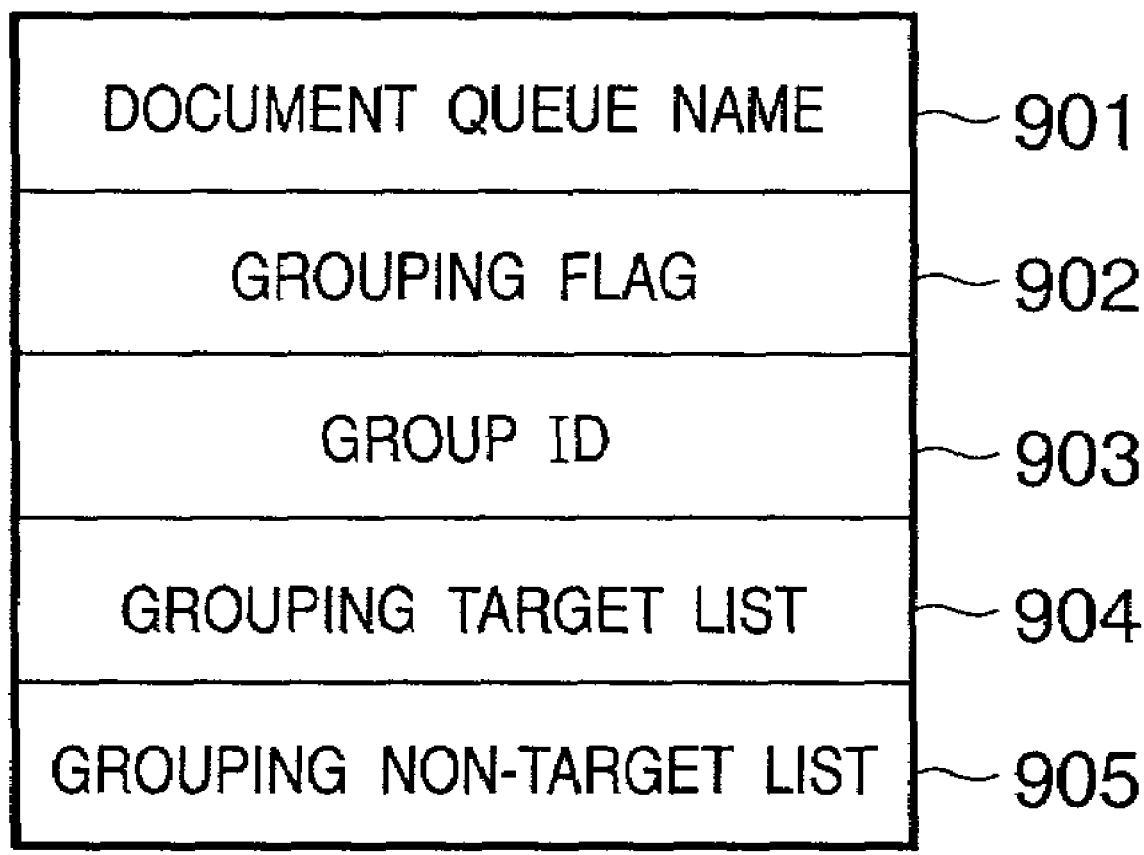
FIG. 9 is a view for explaining print queue information according to the embodiment of the present invention.

FIG. 9 shows a print queue information held by the print system (client) 707. The number of pieces of print queue information to be held is equal to the number of print queues in the spooler 705. Each print queue information includes a document queue name 901 corresponding to a print queue in the spooler 705, a grouping flag 902 to be set upon reception of a grouping start instruction from the print application 703, a group ID 903 newly issued every time a grouping start instruction is received, a grouping target list 904 storing job information of grouping target print jobs, and a grouping non-target list 905 storing the job information of print jobs which are not grouping targets.

Figure 10:
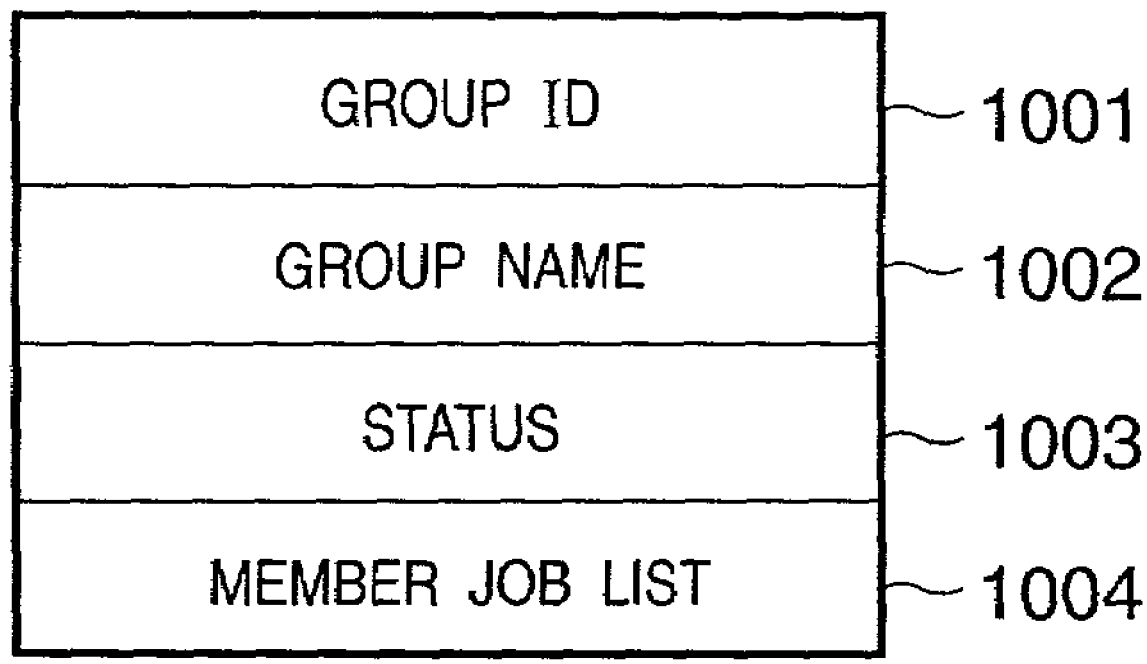
FIG. 10 is a view for explaining group information according to the embodiment of the present invention.

FIG. 10 shows group information which is created by the print system (client) 707 to manage the grouped jobs. The group information includes a group ID 1001 for identifying a group, a group name 1002, a group status 1003, and a member job list 1004 storing jobs in the group (to be referred to as member jobs).

In this case, examples of the status of a group are "wait for scheduling" (to be described in detail later) and "sending" that indicates that print data (data, intermediate codes, and the like created by the printer driver) are being transmitted to the network printer 710.

Figure 11:
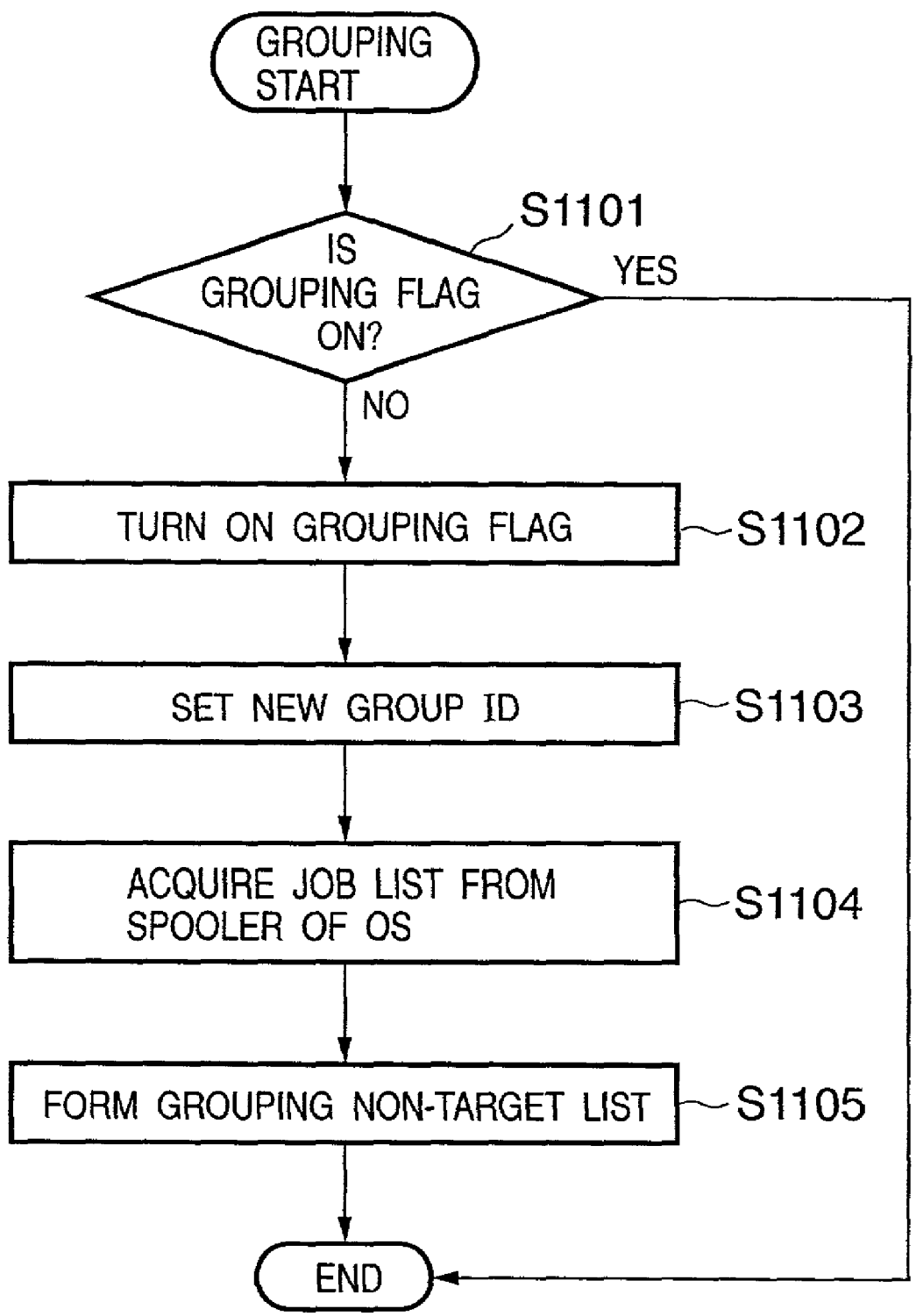
FIG. 11 is a flow chart showing the flow of processing to be performed when the print system (client) according to the embodiment of the present invention receives a grouping start instruction from a print application.

FIG. 11 is a flow chart showing the flow of processing performed by the print system (client) 707 upon reception of a grouping start instruction from the print application 703. In step S1101, it is checked whether the grouping flag 902 in the print queue information is ON. If it is ON, the processing is terminated. If the flag is not ON, the grouping flag 902 is turned on in step S1102. In step S1103, a new group ID is issued and set in the group ID 903 of the print queue information. In step S1104, a list of jobs currently spooled is acquired from the spooler 705 of the OS. The jobs stored in the spooler 705 at this point of time are jobs that are not to be grouped. In step S1105, therefore, the acquired job information is stored in the grouping non-target list 905 of the print queue information, and the processing is terminated.

Figure 12:
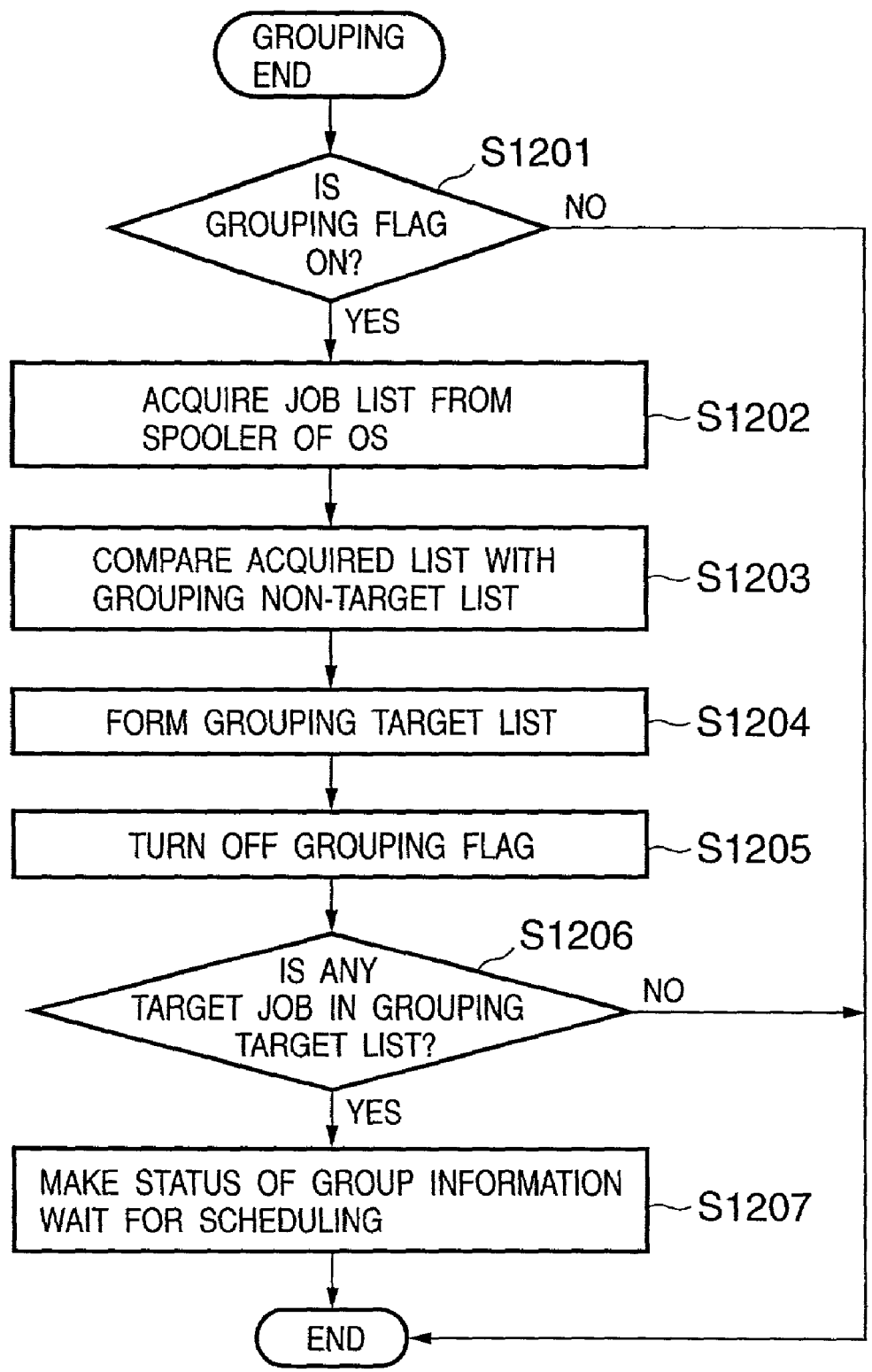
FIG. 12 is a flow chart showing the flow of processing to be performed when the print system (client) according to the embodiment of the present invention receives a grouping end instruction from a print application.

FIG. 12 is a flow chart showing the flow of processing performed by the print system (client) 707 upon reception of a grouping end instruction from the print application 703. In step S1201, it is checked whether the grouping flag in the print queue information is ON. If it is not ON, the processing is terminated. If the flag is ON, a list of jobs currently spooled is acquired from the spooler 705 of the OS in step S1202. In step S1203, the job list acquired from the spooler 705 is compared with the grouping non-target list 905. In step S1204, the job information of jobs which exist in the job list acquired from the spooler 705 and do not exist in the grouping non-target list 905 is stored in the grouping target list 904. At this time, the group ID 1001 of the print queue information is added to the job information.

In step S1205, the grouping flag 902 of the print queue information is turned off. In step S1206, it is checked whether the grouping target list 904 of the print queue information includes any job having job information containing a group job ID coinciding with the current group job ID (which can be identified by the group ID 903 in the print queue information). If NO in ste S1206, the processing is terminated. If there is a job having hob information containing a group job ID coinciding with the current group jog ID, the status 1003 of the group information is made to wait for scheduling, and the processing is terminated in S1207. The member jobs of the group which are made to wait for scheduling are sequentially scheduled by the print system (server) 708 and transmitted to the network printer 710.

Figure 13:
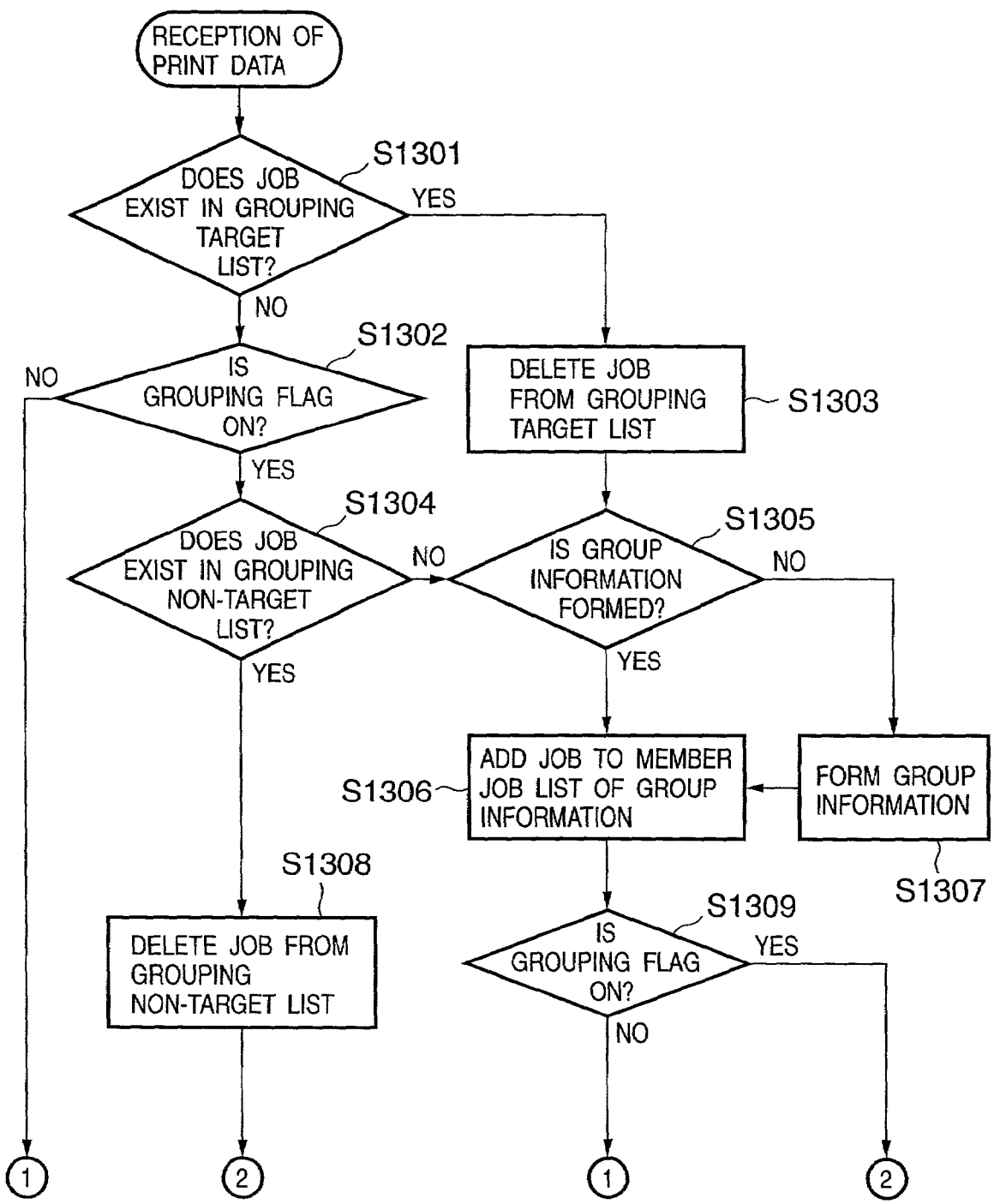
FIG. 13 is a flow chart showing the flow of processing to be performed when the print system (client) according to the embodiment of the present invention receives a print instruction from the spooler of the OS.
Figure 14:
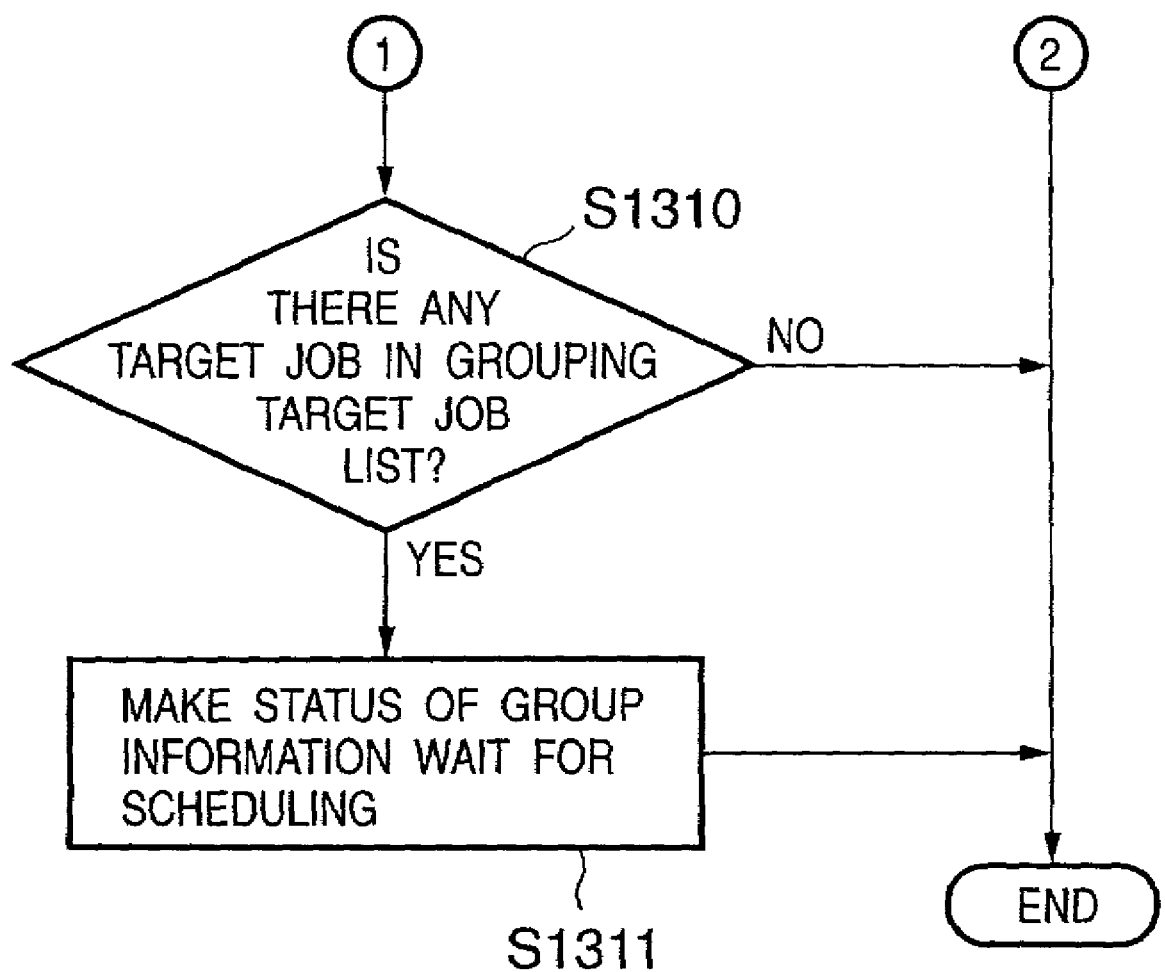
FIG. 14 is a flow chart showing the flow of processing to be performed when the print system (client) according to the embodiment of the present invention receives a print instruction from the spooler of the OS.

FIGS. 13 and 14 are flow charts showing the flow of processing to be performed when the print system (client) 707 receives a print job from the spooler 705 of the OS. It should be noted that there two different timings at which the print system (client) 707 receives a print job input to the spooler 705 by the print application 703 upon issuing a grouping start instruction to the print system (client) 707. At the first timing, the print system (client) 707 receives a print job from the spooler 705 before the print application 703 issues a grouping end instruction to the print system (client) 707. At the second timing, the print system (client) 707 receives a print job from the spooler 705 after the print application 703 issues a grouping end instruction to the print system (client) 707. The manner in which the print system (client) 707 determines whether to perform grouping of each print job received from the spooler 705 differs before and after a grouping end instruction is received. A print job received before the reception of a grouping end instruction becomes a grouping target if it is not contained in the grouping non-target list 905 of the print queue information. A print job received after the reception of a grouping end instruction becomes a grouping target if it is contained in the grouping target list 904 of the print queue information. Whether a grouping end instruction is received or not received yet is determined by using the grouping flag 902 in the print queue information.

Upon reception of a print job from the spooler 705, the print system (client) 707 refers to the job ID of the print job received from the spooler 705 to check in step S1301 whether the grouping target list 904 of the print queue information contains job information having a job ID coinciding with the job ID of the received print job. If YES in step S1301, the print system (client) 707 extracts the corresponding job information from the grouping target list 904 in step S1303. In step S1305, the print system (client) 707 checks whether group job information corresponding to the group ID set in the extracted job information is created. If NO in step S1305, the print system (client) 707 creates group information in step S1307. In step S1306, the print system (client) 707 adds the job information extracted from the grouping target list 904 of the print queue information to the member job list 1004 of the group information. The print system (client) 707 checks in step S1309 whether the grouping flag 902 is ON. If the flag is ON, the processing is terminated.

If it is determined in step S1309 that the grouping flag 902 is OFF, it is checked in step S1310 whether the grouping target list 904 of the print queue information includes any job having job information containing a group job ID coinciding with the current group ID. If NO in step S1310, the processing is terminated. If YES in step S1310, the status 1003 of the group information is made to wait for scheduling in step S1311, and the processing is terminated. The member jobs of the group having statuses 1003 made to wait for scheduling are sequentially scheduled by the print system (server) 708 and transmitted to the network printer 710.

If it is determined in step S1301 that the print queue information includes no job information whose job ID coincides with the job ID received from the spooler 705, it is determined in step S1302 that the grouping flag 902 in the print queue information is ON. If the grouping flag 902 in the print queue information is ON, it is checked in step S1304 whether there is any job information whose job ID coincides with any job ID in the grouping non-target list 905 of the print queue information. If NO in step S1304, since the extracted print job is a print job to be grouped, the flow advances to the S1305. If it is determined in step S1304 that there is job information whose job ID coincides with any job ID in the grouping non-target list 905 of the print queue information, the job information is deleted from the grouping non-target list 905 in step S1308, and the processing is terminated.

As described above, in the decision processing in step S1304, since a grouping non-target list is recognized in advance, even if a print job is received from the spooler before a grouping end instruction is received, i.e., before a grouping target list is completely determined, whether the received print job is a member of a group job or not can be determined depending on whether it is a print job (grouping non-target list) spooled at the time of the issuance of a grouping start instruction corresponding to the grouping end instruction. If this job is not included in the grouping target list, the job can be determined as a grouping target. This makes it possible to match a print job output as a grouping target from the print application with a print job to be grouped in the print system with a simple mechanism without establishing synchronization between the timing at which the print system receives a grouping start/end instruction from the application and the timing at which the print system receives print data from the spooler.

If it is determined in step S1302 that the grouping flag 902 of the print queue information is OFF, it is checked in step S1310 whether the grouping target list 904 of the print queue information includes a job having job information containing a group ID coinciding with the current group job ID. If NO in step S1310, the processing is terminated. If YES in step S1310, the status 1003 of the group information is made to wait for scheduling in step S1311, and the processing is terminated. The member jobs of the group which have the statuses 1003 made to wait for scheduling are sequentially scheduled by the print system (server) 708 and transmitted to the network printer 710.

Figure 15:
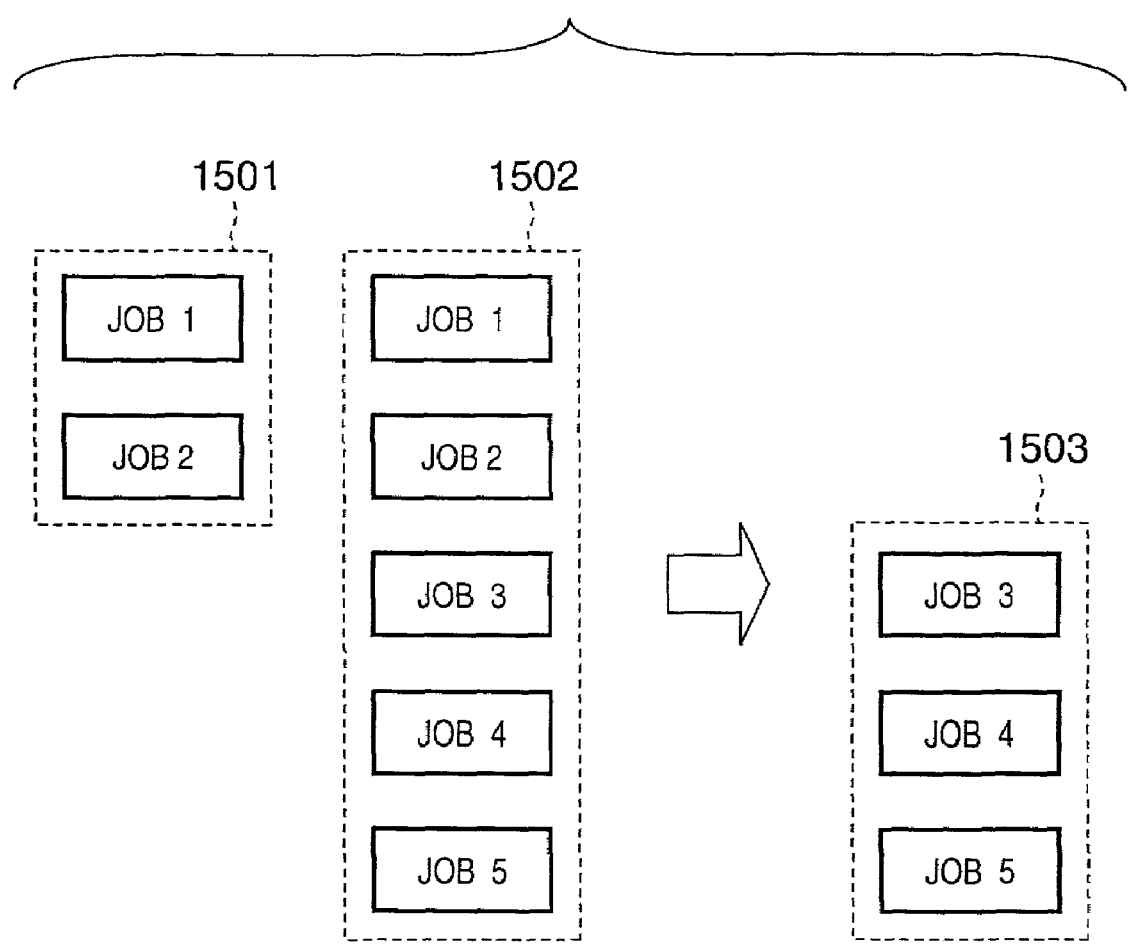
FIG. 15 is a view showing the process in which the print system (client) according to the embodiment of the present invention forms a grouping target list.

FIG. 15 is a view for explaining the process of creating a grouping target list in step S1204 in FIG. 12. A job list 1501 is a list of jobs contained in the grouping non-target list 905. A job list 1502 is a job list acquired from the spooler 705. The job lists 1501 and 1502 are compared with each other, and the jobs existing in the job list 1502 are added to a list 1503 of jobs to be grouped except for the jobs existing in the job list 1501.

With the mechanism described with reference to FIG. 15, upon reception of a grouping end instruction, the print system (client) 707 recognizes the difference between the job spooled state (indicating what jobs are stored) of the spooler 705 at the time of the reception of the previous grouping end instruction and the job spooled state of the spooler 705 at the time of the reception of the current grouping end instruction, and can determine a grouping target list by regarding print jobs corresponding to the recognized difference as grouping targets. Even if, therefore, the timing at which the print system receives a grouping start/end instruction from the application differs from the timing at which the print system receives print data from the spooler, the print system can match a print job output as a grouping target from the application with a print job to be grouped in the print system with a simple mechanism.

According to another application example, the processing in FIG. 15 and associated processing may be performed by the hard disk and the like of the print server PC 101. More specifically, this arrangement can be implemented by letting the print server PC 101 have the function of the print system (client) 707 and having a means for allowing the print server PC 101 to browse the spooled state of an information processing apparatus serving as a grouping print instruction source.

Another form is also expected, in which an external information processing apparatus issues a grouping print instruction for a plurality of application data (data created by a wordprocessor, image data, EMF intermediate format files, and the like) stored in the hard disk and the like of the print server PC 101. In this case, the external information processing apparatus may have the function of issuing a print instruction to the print server PC 101. In addition, the print server PC 101 converts stored application data into a print instruction (device-dependent rendering function) that can be interpreted by the printer driver. In addition, the printer driver function converts this print instruction into print data that can be interpreted by the printer to make the printer device execute printing. In this case, it is expected that the print server PC 101 and the external information processing apparatus can communicate with each other through a LAN or Internet communication line.

As described above, the print system (client) 707 omits print jobs at the time of the generation of a grouping start instruction from print jobs at the time of the generation of a grouping end instruction, and the resultant print jobs are registered as the member jobs of the group. With this operation, print jobs to be grouped which are designated by an application can be grouped in the designated manner and can be output.

As has been described above, according to the present invention, by inputting print jobs to the spooler in the time interval between the instant at which an print application issues a grouping start instruction and the instant at which the application issues a grouping end instruction, the print system can group print jobs as designated by the application.

In addition, a group job including grouped print jobs as member jobs can be created.

Assume that a print job is received from the spooler in the time interval between the instant at which a grouping start instruction is issued and the instant at which a grouping end instruction is issued. In this case, if the print job is not a print job that is spooled before the grouping start instruction is issued, this print job can also be added to the member jobs of the group job.

If a print job as a member job of the group job is received from the spooler after a grouping end instruction is received, this print job can be scheduled.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a spool unit which spools print jobs, for transmitting plural print jobs set as a group job for printing, comprising:
    a first list generating unit for obtaining a list of print jobs spooled in the spool unit in response to reception of a job grouping start instruction, and for generating a non-grouping target list of print jobs;
    a second list generating unit for generating a grouping target list based upon a difference between a list of print jobs spooled at the time of reception of a job grouping end instruction and the generated non-grouping target list in response to the reception of the job grouping end instruction;
    a member generating unit for setting print jobs as members of a group job based upon the grouping target list; and
    a control unit for controlling a transmitter to transmit plural print jobs, including print jobs set as the members by said member generating unit, to a printing device as the group job.

2. The apparatus according to claim 1, wherein, when a print job spooled in the spool unit is received, said member generation unit determines whether the received print job is a print job to be grouped based on the grouping target list, and sets the received print job as a member of the group job if it is determined that the received print job is to be grouped.

3. The apparatus according to claim 1, wherein even if the grouping target list is not generated, said member generating unit determines whether the received print job is contained in the non-grouping target list when the print job is received in a time interval between the instant at which a grouping start instruction is issued and the instant at which a grouping end instruction is issued, and adds the received print job to the group job as a member if the received print job is not contained in the non-grouping target list.

4. An information processing method for an information processing apparatus using a spool unit which spools print jobs, for transmitting plural print jobs set as a group job for printing, comprising:
    a first list generating step of obtaining a list of print jobs spooled in the spool unit in response to reception of a job grouping start instruction and generating a non-grouping target list of print jobs;
    a second list generating step of generating a grouping target list based upon a difference between a list of print jobs spooled at the time of reception of a job grouping end instruction, and the non-grouping target list in response to the reception of the job grouping end instruction;
    a member generating step of setting print jobs as members of a group job based upon the grouping target list; and
    a control step of controlling a transmitter to transmit plural print jobs, including print jobs set as the members in said member generating step, to a printing device as the group job.

5. The method according to claim 4, wherein, when a spooled print job spooled in the spool unit is received, said member generation step determines whether the received print job is a print job to be grouped based on the grouping target list, and sets the received print job as a member of the group job if it is determined that the received print job is to be grouped.

6. The method according to claim 4, wherein in the member generating step, even if the grouping target list is not generated, it is determined whether the received print job is contained in the non-grouping target list, when the print job is received in a time interval between the instant at which a grouping start instruction is issued and the instant at which a grouping end instruction is issued, the received print job is added to the group job as a member if the received print job is not contained in the non-grouping target list.

7. A computer program embodied on a computer readable storage medium, which is executable by an information processing apparatus using a spool unit which spools print jobs, to transmit plural print jobs set as a group job for printing, said program comprising:
- a first list generating step of obtaining a list of print jobs spooled in the spool unit in response to reception of a job grouping start instruction and generating a grouping non-target list of print jobs;
- a second list generating step of generating a grouping target list based upon a difference between a list of print jobs spooled at the time of reception of a job grouping end instruction, and generating a non-grouping target list in response to the reception of the job grouping end instruction;
- a member generating step of setting print jobs as members of a group job based upon the grouping target list; and
- control step of controlling a transmitter to transmit plural print jobs, including print jobs set as the members by said member generating unit, to a printing device as the group job.

8. The program according to claim 7, wherein, when a print job spooled in the spool unit is received, said member generation step determines whether the received print job is a print job to be grouped based on the grouping target list, and sets the job as a member of the group job if it is determined that the received print job is to be grouped.

9. The program according to claim 7, wherein even if the grouping target list is not generated, it is determined whether the received print job is contained in the non-grouping target list when the print job is received in a time interval between the instant at which a grouping start instruction is issued and the instant at which a grouping end instruction is issued, the received print job is added to the group job as a member if the received print job is not contained in the non-grouping target list.

10. An information processing system having a spool unit which spools a print job, for transmitting plural print jobs set as a group job for printing, comprising:
- a first list generating unit for obtaining a list of print jobs spooled in the spool unit in response to reception of a job grouping start instruction, and generating a non-grouping target list of print jobs;
- a second list generating unit for generating a grouping target list based upon a difference between a list of print jobs spooled at the time of reception of a job grouping end instruction and the non-grouping target list in response to the reception of the job grouping end instruction;
- a member generating unit for setting print jobs as members of a group job based upon the grouping target list; and
- a control unit for controlling a transmitter to transmit plural print jobs, including print jobs set as the members by said member generating unit, to a printing device as the group job.

11. The system according to claim 10, wherein, when a print job spooled in the spool unit is received, said member generation unit determines whether the received print job is a print job to be grouped based on the grouping target list, and sets the received print job as a member of the group job if it is determined that the received print job is to be grouped.

12. The system according to claim 10, wherein even if the grouping target list is not generated, said member generating unit determines whether the received print job is contained in the non-grouping target list when the print job is received in a time interval between the instant at which a grouping start instruction is issued and the instant at which a grouping end instruction is issued, and adds the received print job to the group job as a member if the received print job is not contained in the non-grouping target list.

13. An information processing apparatus having a spool unit which spools a print job, for transmitting plural print jobs set as a group job for printing, comprising:
- a receiving unit for receiving a print job spooled by the spool unit;
- a member generating unit for, when a print job is received by said receiving unit before a job grouping end instruction is received, determining whether the received print job is a target member job of a group job, depending on whether the received print job differs from a print job that is spooled in the spool unit when a grouping start instruction is issued; and
- a control unit for controlling a transmitter to transmit plural print jobs, including print jobs set as the members by said member generating unit, to a printing device as the group job.

14. The apparatus according to claim 13, wherein when a job grouping end instruction is issued, said member generating unit performs control to determine a difference between a spooled state of the print jobs in the spool unit at the time of issuance of a grouping start instruction and a spooled state of the print jobs in the spool unit at the time of issuance of the grouping end instruction as a grouping target.

15. The apparatus according to claim 13, wherein the job grouping start instruction or the job grouping end instruction is issued by a second information processing apparatus that communicates with the apparatus through a predetermined communication line.

16. An information processing method for an information processing apparatus using a spool unit which spools a print job, for transmitting plural print jobs set as a group job for printing, comprising:
- a receiving step of receiving a print job spooled by the spool unit;
- a member generating step of, when a print job is received in the receiving step before a job grouping end instruction is received, determining whether the received print job is a target member job of a group job, depending on whether the received print job differs from a print job that is spooled in the spool unit when a grouping start instruction is issued; and
- a control step of controlling a transmitter to transmit plural print jobs to a printing device as the group job.

17. The method according to claim 16, wherein in the member generating step, when a job grouping end instruction is issued, control is performed to determine a difference between a spooled state of the print jobs in the spool unit at the time of issuance of a grouping start instruction and a spooled state of the print jobs in the spool unit at the time of issuance of the grouping end instruction as a grouping target.

18. The method according to claim 16, wherein the job grouping start instruction or the job grouping end instruction is issued by a second information processing apparatus that communicates with the information processing apparatus through a predetermined communication line.

19. A computer program embodied on a computer readable storage medium, which is executable by an information processing apparatus to set a plurality of print jobs as member jobs of a group job and continuously printing the member jobs included in the group job in a designated order, said program comprising:
- a receiving step of receiving a spooled print job spooled by the spool unit; and a member forming generating step of, when a print job is received by said receiving step before a job grouping end instruction is received, determining whether the received print job is a target member job of a group job, depending on whether the received print job differs from a print job that is spooled in the spool unit when a grouping start instruction is issued; and a control step of controlling a transmitter to transmit plural print jobs, including print jobs set as the members by said member generating procedure code, to a printing device as the group job.

20. The program according to claim 19, wherein when a job grouping end instruction is issued, control to determine a difference between a spooled state of the print jobs in the spool unit is performed by said member forming generating step at the time of issuance of a grouping start instruction and a spooled state of the print jobs in the spool unit at the time of issuance of the grouping end instruction as a grouping target.

21. The program according to claim 19, wherein the job grouping start instruction or the job grouping end instruction is issued by a second information processing apparatus that communicates with the information processing apparatus through a predetermined communication line.

22. An information processing system having a spool unit which spools a print job, for transmitting plural print jobs set as a group job for printing, comprising:

a receiving unit for receiving a print job spooled by the spool unit;

a member generating unit for, when a print job is received by said receiving unit before a job grouping end instruction is received, determining whether the received print job is a target member job of a group job, depending on whether the received print job differs from a print job that is spooled in the spool unit when a grouping start instruction is issued; and a control unit for controlling a transmitter to transmit plural print jobs, including print jobs set as the members by said member generating unit, to a printing device as the group job.

23. The system according to claim 22, wherein when a job grouping end instruction is issued, said member generating unit performs control to determine a difference between a spooled state of the print jobs in the spool unit at the time of issuance of a grouping start instruction and a spooled state of the print jobs in the spool unit at the time of issuance of the grouping end instruction as a grouping target.

24. The system according to claim 22, wherein the job grouping start instruction or the job grouping end instruction is issued by a second information processing apparatus that communicates with the system through a predetermined communication line.

* * * * *